(12) United States Patent
Doerr et al.

(10) Patent No.: US 9,477,039 B2
(45) Date of Patent: Oct. 25, 2016

(54) SLAB-MODE AND POLARIZATION CLEAN-UP IN SILICON PHOTONICS

(71) Applicant: Acacia Communications, Inc., Maynard, MA (US)

(72) Inventors: Christopher Doerr, Middleton, NJ (US); Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/475,506

(22) Filed: Sep. 2, 2014

(65) Prior Publication Data

US 2015/0063769 A1    Mar. 5, 2015

Related U.S. Application Data

(60) Provisional application No. 61/872,659, filed on Aug. 31, 2013.

(51) Int. Cl.
*G02B 6/122* (2006.01)
*G02B 6/134* (2006.01)
*G02B 6/12* (2006.01)

(52) U.S. Cl.
CPC ............... *G02B 6/122* (2013.01); *G02B 6/134* (2013.01); *G02B 2006/12097* (2013.01)

(58) Field of Classification Search
CPC .............. G02B 6/122; G02B 6/135; G02B 2006/12097
USPC .................................... 385/132, 141
See application file for complete search history.

(56) References Cited

U.S. PATENT DOCUMENTS

| 2006/0045522 | A1* | 3/2006 | Gill ........................ | G02F 1/025 398/50 |
| 2006/0215949 | A1* | 9/2006 | Lipson .................... | G02F 1/025 385/2 |
| 2011/0217002 | A1* | 9/2011 | Mekis ..................... | G02B 6/26 385/28 |

* cited by examiner

*Primary Examiner* — Ryan Lepisto
(74) *Attorney, Agent, or Firm* — Wolf, Greenfield & Sacks, P.C.

(57) ABSTRACT

Disclosed are structures and methods directed to waveguide structures exhibiting improved device performance including improved attenuation of scattered light and/or transverse magnetic modes. In an illustrative embodiment according to the present disclosure, a rib waveguide structure including a rib overlying a slab waveguide (or superimposed thereon) is constructed wherein the slab waveguide is heavily doped at a distance from the rib which has a very low overlap with rib guided modes. Advantageously, such doping may be of the P-type or of the N-type, and dopants could be any of a number of known ones including—but not limited to—boron, phosphorous, etc.—or others that increase optical propagation loss. As may be appreciated, the doped regions advantageously absorb scattered light which substantially improves the structures' performance.

17 Claims, 4 Drawing Sheets

SLAB-MODE AND POLARIZATION CLEAN-UP IN SILICON PHOTONICS

CROSS REFERENCE TO RELATED APPLICATIONS

This application claims the benefit of U.S. Provisional Patent Application Ser. No. 61/872,659 filed Aug. 31, 2013 which is incorporated by reference in its entirety as if set forth at length herein.

TECHNICAL FIELD

This disclosure relates generally to photonic structures and systems. More particularly, this disclosure pertains to techniques, methods and apparatus for suppressing slab modes and/or transverse magnetic modes in silicon rib waveguides.

BACKGROUND

A rib waveguide structure such as that shown schematically in FIG. 1 is a partially etched waveguide in which light is guided by a raised portion on a relatively wide slab waveguide. Such a rib waveguide allows for a reduced lateral index contrast and is advantageously employed in silicon photonics to make low-loss waveguides, waveguide crossings, directional couplers, adiabatic couplers and other structures. Notwithstanding, the slab waveguide in such structures guides much of the light that is scattered from the rib waveguide and which may later couple back into the rib waveguide, photo detectors, or other waveguides thereby degrading photonic integrated circuit (PIC) performance. Accordingly, improvements to such structures would represent a welcome addition to the art.

SUMMARY

The above problem(s) are solved and an advance in the art is made according to an aspect of the present disclosure directed to waveguide structures exhibiting improved device performance including improved attenuation of scattered light and/or transverse magnetic modes.

In an illustrative embodiment according to the present disclosure, a rib waveguide structure including a rib overlying a slab waveguide (or superimposed thereon) is constructed wherein the slab waveguide is heavily doped at a distance from the rib which has a very low overlap with rib guided modes. Advantageously, such doping may be of the P-type or of the N-type, and dopants could be any of a number of known ones including—but not limited to—boron, phosphorous, etc.—or others that increase optical propagation loss. As may be appreciated, the doped regions advantageously absorb scattered light which substantially improves the structure's performance.

Alternative illustrative embodiments of structures according to the present disclosure will include a metal deposited upon the slab waveguide at a distance from the rib such that scattered light is absorbed and the structure's performance is likewise enhanced.

BRIEF DESCRIPTION OF THE DRAWING

A more complete understanding of the present disclosure may be realized by reference to the accompanying drawing in which.

DETAILED DESCRIPTION

Figure 1:
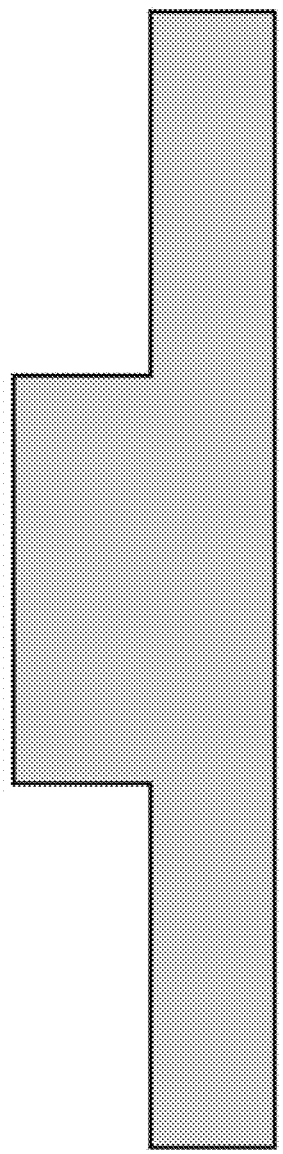
FIG. 1 shows a schematic of an illustrative prior-art rib waveguide structure.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by again noting with reference to FIG. 1 a prior-art rib waveguide structure. As may be observed, such a structure includes a rib portion that overlies or otherwise superimposed upon a slab waveguide. Note further that while FIG. 1 shows a single rib and slab, a rib waveguide structure may include multiple ribs overlying a single slab. Accordingly, one useful definition of a rib waveguide is one in which a light guiding layer includes a slab and a strip (or rib or several strips) overlying or otherwise superimposed onto it. Note further that while the shapes of the slab and the rib structures are shown as rectangular, for the purposes of this disclosure, more rounded shapes may result and/or be desirable.

Figure 2:
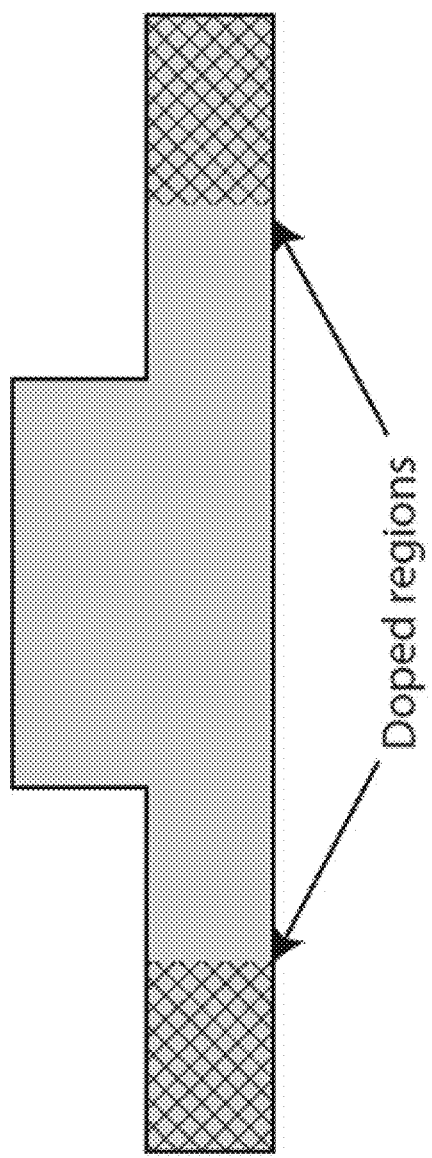
FIG. 2 shows a schematic of an illustrative rib waveguide structure having doped slab regions to absorb scattered and/or transverse magnetically polarized light according to an aspect of the present disclosure.

Turning now to FIG. 2, there is shown an illustrative rib waveguide structure according to the present disclosure in which doped regions are formed in the underlying slab at a distance from the rib region(s). In this illustrative embodiment shown, the slab waveguide is heavily doped at a distance from the rib which has a very low overlap with the rib guided modes. Advantageously, such doping may be of the P-type or of the N-type, and dopants could be any of a number of known ones including—but not limited to—boron, phosphorous, etc.—or others that increase optical propagation loss. As may be appreciated, the doped regions advantageously absorb scattered light which substantially improves the structure's performance.

In one illustrative embodiment, a typical distance from an edge of the rib to an edge of the doped region is from 1 to 2 $\mu$m. As will be discussed, on ecould also deposit a metal overlying these doped regions as will be discussed with reference to FIG. 3. Additionally, a more detailed illustrative embodiment is shown in FIG. 4.

Figure 3:
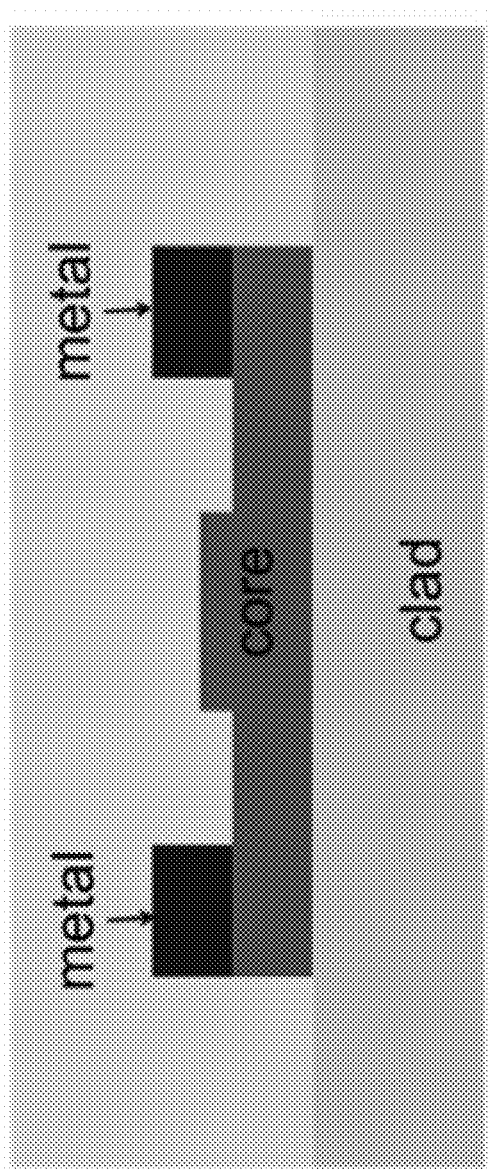
FIG. 3 shows a schematic of an illustrative rib waveguide structure with metal overlying slab regions to absorb scattered and/or transverse magnetically polarized light according to an aspect of the present disclosure.

Notably, one alternative exemplary embodiment according to the present disclosure is shown in FIG. 3. In that alternative exemplary embodiment, a rib waveguide configuration includes a metal deposited onto particular areas of the slab regions such that scattered and/or transverse magnetically polarized light is absorbed. With further reference to that FIG. 3, it may be observed that a rib waveguide structure including a rib and slab is shown overlying a cladding layer (clad). As may be further observed, the rib overlies a portion of the slab while a metal is shown overlying other portion(s) of that slab. It may be observed that the metal overlies those regions that roughly correspond to the heavily doped regions shown and described previously. Accordingly, the metal is deposited overlying the slab at a distance from the rib.

Figure 4:
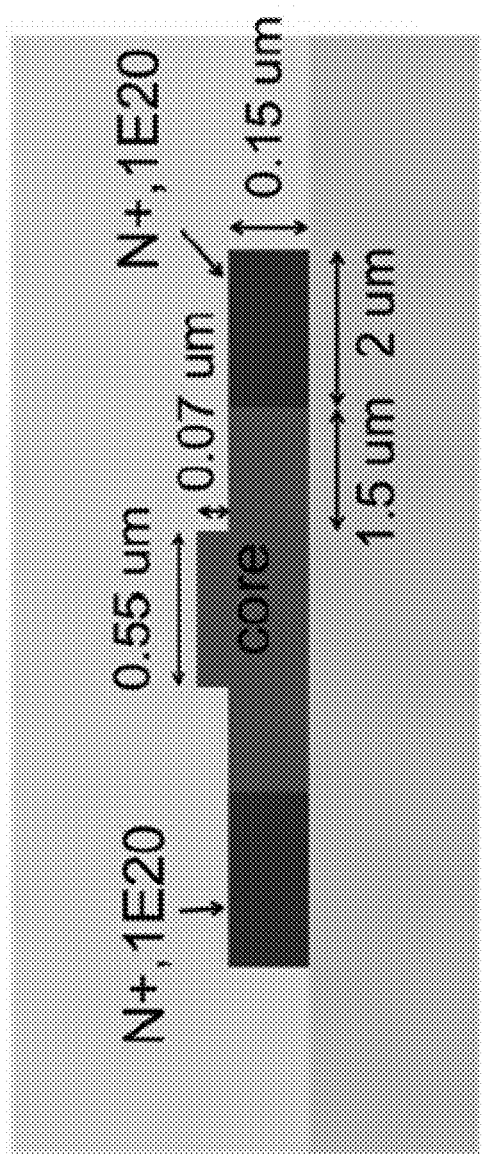
FIG. 4 shows a schematic of an illustrative rib waveguide structure according to an aspect of the present disclosure such that scattered and/or transverse magnetically polarized light is absorbed.

With reference now to FIG. 4, there is shown a further illustrative embodiment of a rib waveguide structure according to an aspect of the present disclosure. The rib waveguide structure is formed from silicon waveguides and the following Table 1 illustrates absorption loss for some of the modes at a wavelength of 1550 nm.

TABLE 1

Calculated Parameters for Illustrative Waveguide

| Mode | Effective Index | Alpha (cm$^{-1}$) | Attenuation (dB/cm) |
|---|---|---|---|
| TE0 | 2.702 | 0.0025 | 0.01 |
| TM0 | 1.867 | 64.8 | 282 |
| TE1 | 2.533 | 340 | 1480 |
| TE2 | 2.530 | 503 | 2183 |
| TE3 | 2.514 | 405 | 1760 |
| TE4 | 2.502 | 389 | 1690 |
| TE5 | 2.476 | 405 | 1760 |

With reference to that FIG. 4 it is illustratively depicted therein a rib waveguide structure according to the present disclosure wherein a rib overlies a slab. Shown therein in this exemplary figure the rib is 0.55 $\mu$m wide and 0.07 $\mu$m thick overlying a slab that is 0.15 $\mu$m thick. The slab regions located substantially 1.5 $\mu$m from the edge of the rib is heavily doped for substantially 2 $\mu$m. That doping is illustratively shown as N+ doping, exhibiting 1E20 dopant concentrations. From the Table 1, it is observed that the structure so constructed is fully transparent to TE0 mode (absorption loss is only 0.01 dB/cm), but strongly absorptive to the TM0 mode, and extremely absorptive to all other higher-order modes. For example, with a propagation length of only 1 mm, the TM0 mode will be attenuated by 28 dB, and all other higher-order modes are completely eliminated.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A rib waveguide structure comprising:
a slab waveguide; and
a rib formed upon a top surface of the slab waveguide, wherein the rib is configured to support a TE0 mode of light,
wherein the slab waveguide includes a first doped region and a second doped region not contacting the rib,
wherein the first doped region and the second doped region are spaced from the rib such that the rib waveguide structure is fully transparent to the TE0 mode of light, and
wherein the first doped region and the second doped region are spaced from the rib such that the rib waveguide structure is absorptive of a TM0 mode of light.

2. The rib waveguide structure of claim 1, wherein the first doped region is spaced from the rib by 1-2 $\mu$m.

3. The rib waveguide structure of claim 2, wherein the first doped region includes an N-type dopant.

4. The rib waveguide structure of claim 2, further including a metal deposited upon the slab waveguide in contact with the first doped region.

5. The rib waveguide structure of claim 2, wherein the first doped region includes a P-type dopant.

6. The rib waveguide structure according to claim 1, wherein the first doped region is doped to a concentration of substantially $1 \times 10^{20}$ dopants/cm$^3$.

7. The rib waveguide structure of claim 1, wherein the first doped region and second doped region are separated by a third region of the slab waveguide having a different doping concentration than that of either the first doped region or the second doped region.

8. The rib waveguide structure of claim 1, further comprising a first metal portion in direct contact with the first doped region and a second metal portion in direct contact with the second doped region.

9. The rib waveguide structure of claim 8, further comprising a cladding layer contacting the slab waveguide, wherein the slab waveguide is disposed between the cladding layer and the rib.

10. The rib waveguide structure of claim 8, wherein each of the first and second doped regions is doped to a concentration of substantially $1\times10^{20}$ dopants/cm$^3$.

11. The rib waveguide structure of claim 8, wherein the rib has a first edge substantially perpendicular to the slab waveguide, and wherein the first doped region is disposed substantially 1.5 microns from the first edge and the rib.

12. The rib waveguide structure of claim 1, wherein the first doped region is spaced from the rib by 1-2 µm.

13. The rib waveguide structure of claim 1, further including a metal deposited upon the slab waveguide in contact with the first doped region and lacking an electrical contact.

14. The rib waveguide structure of claim 1, wherein the first doped region is doped to a concentration of substantially $1\times10^{20}$ dopants/cm$^3$.

15. The rib waveguide structure of claim 1, further comprising a cladding layer contacting the slab waveguide, wherein the slab waveguide is disposed between the cladding layer and the rib.

16. A rib waveguide structure comprising:
    a slab waveguide; and
    a rib formed upon a top surface of the slab waveguide, wherein the rib is configured to support a TE0 mode of light,
    wherein the slab waveguide includes a first doped region and a second doped region not contacting the rib,
    wherein the first doped region and the second doped region are spaced from the rib such that the rib waveguide structure is fully transparent to the TE0 mode of light, wherein said rib is substantially 0.07 µm thick, and substantially 0.55 µm wide and wherein the first doped region is substantially 1.5 µm from an edge of the rib.

17. The rib waveguide structure according to claim 16, wherein said first doped region is substantially 2 µm in width and said slab waveguide is substantially 0.15 µm thick.

* * * * *